United States Patent [19]

Van Oosterhout

[11] 3,800,300

[45] Mar. 26, 1974

[54] CONDITION RESPONSIVE SIGNAL PRODUCING DEVICE

[75] Inventor: Jack T. Van Oosterhout, Muncie, Ind.

[73] Assignee: Ball Corporation, Muncie, Ind.

[22] Filed: Dec. 23, 1971

[21] Appl. No.: 211,215

[52] U.S. Cl. ........ 340/207 R, 340/177 VA, 331/65, 328/3
[51] Int. Cl. ............................................ G08c 19/16
[58] Field of Search .............. 73/362 AR; 328/3.59; 340/228, 177 VA, 207 R; 331/65; 307/271

[56] References Cited
UNITED STATES PATENTS
3,449,695   6/1969   Marsh .................................. 328/59
3,656,066   4/1972   Reynal ................................. 331/65

*Primary Examiner*—Thomas B. Habecker
*Attorney, Agent, or Firm*—James D. Haynes

[57] ABSTRACT

A circuit device for producing a signal indicative of a particular condition such as, for example, temperature, and for transmitting the signal to a remote location is disclosed herein and includes a circuit arrangement for producing an oscillatory output signal having a frequency indicative of the particular condition. This output signal, in addition to being transmitted, is fed back to the circuit arrangement for eliminating changes in its frequency which would otherwise be caused by fluctuations in the voltage supplies required for operating the circuit device.

4 Claims, 3 Drawing Figures

PATENTED MAR 26 1974　　　　　　　　　　　　　　3,800,300

INVENTOR.
JACK T. VAN OOSTERHAUT
BY Robert E Harris

ATTORNEY

CONDITION RESPONSIVE SIGNAL PRODUCING DEVICE

BACKGROUND OF THE INVENTION

1. Field of the Invention

This invention relates generally to a telemetry system and more particularly to an encoder for producing a transmit-table signal indicative of a particular condition.

2. Description of the Prior Art

It is often necessary to determine the existence and magnitude of a condition at a remote location. This is particularly true, for example, in the maintenance of temperature conditions in glass production wherein glassware, such as containers, tubing, or glass sheets and the like, is formed at relatively high temperatures and is thereafter annealed or heat-treated down to room temperatures.

It is well recognized that the range of temperatures for optimum annealing of glassware is relatively small. It is also recognized that by decreasing annealing time as much as possible, manufacturing efficiency is enhanced. However, the annealing time cannot be decreased to the point where the favorable physical and chemical properties of the glass product are sacrificed. Accordingly, temperature regulation becomes even more critical. Often, the temperature of glassware within an oven, known as a lehr, must be controlled within a tolerance of plus or minus 5° F. in order to achieve optimum annealing. Hence, it is important that the glassware temperature be closely monitored as the ware travels through the annealing lehr or oven. In this manner, better regulation of the temperature in the oven can be achieved which results, of course, in better regulation of glassware temperatures.

Heretofore, there have been many proposed arrangements for controlling the temperature within an annealing lehr such as, for example, optical or radiation pyrometers, electronic pyrometers and thermocouples, none of which have proved to be completely successful. More recently, telemetry systems for transmitting and receiving signals indicative of the temperature in an oven have been suggested by the prior art. While some of these systems are satisfactory for their intended use, most can only be as reliable and accurate as the power which drives them. Accordingly, if, for example, the voltage level with which many of these systems produce a temperature indicative signal for transmission fluctuates in an undesirable manner, the temperature indicative characteristic of the signal may also fluctuate in response thereto and thereby cause inaccurate information at the receiving end of the system. In addition, high power consumption and large numbers of required precision components have plagued many of these systems.

SUMMARY OF THE INVENTION

The present invention provides a heretofore unavailable improvement in telemetry systems for transmitting and receiving signals indicative of a particular condition such as, for example, temperature and particularly in an encoder for use with such systems. The encoding device constructed in accordance with the present invention eliminates many of the foregoing deficiencies of the prior art as well as other deficiencies thereof.

Accordingly, an object of the present invention is to provide a new and improved circuit device for accurately and reliably producing a transmittable signal indicative of a particular condition such as, for example, the temperature within an annealing lehr.

Another object of the present invention is to provide a new and improved device for producing a transmittable signal having a condition indicative characteristic which is unaffected by undesirable fluctuations in the voltage supply means utilized in the production of said signal.

Yet another object of the present invention is to provide a new and improved device for producing a transmittable signal having a frequency indicative of a particular condition such as, for example, the temperature within an annealing lehr and a peak-to-peak amplitude which is dependent upon the voltage levels provided for operating said device.

Still another object of the present invention is to provide a new and improved circuit device which minimizes the power required in producing a transmittable condition indicative signal.

Yet another object of the present invention is to provide a new and improved circuit device which requires only five precision components in producing a transmittable condition indicative signal.

These and other objects and features of the present invention will become apparent from the following descriptions.

DETAILED DESCRIPTION

Figure 1:
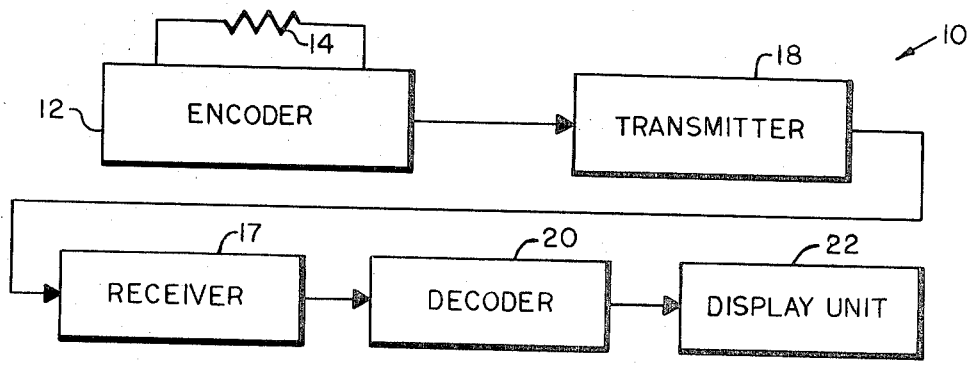
FIG. 1 is a block diagram of a telemetry system constructed in accordance with the present invention.
Figure 3:
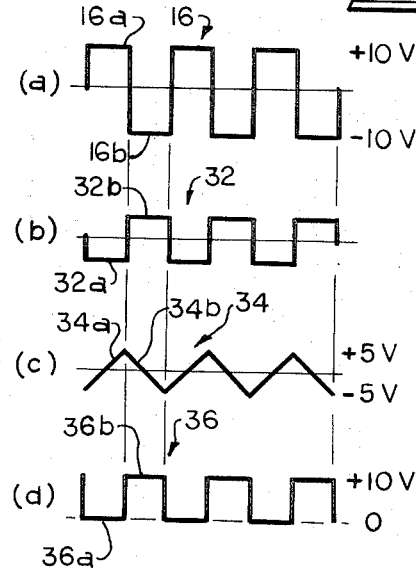
FIG. 3 is an illustration of various signals produced by the encoding device shown in FIG. 2.

Turning now to the drawings wherein like components are designated by like reference numerals throughout the various figures, a telemetry system 10 for monitoring a particular condition such as, for example, the temperature within an annealing lehr or oven is illustrated in FIG. 1 and includes an encoder 12 which is constructed in accordance with the present invention. A temperature sensitive component such as, for example, a platinum resistor 14, is provided with the encoder which produces an output signal 16 (FIG. 3a) having a frequency indicative of the temperature of resistor 14 and therefore its surrounding environment. In the event that system 10 is utilized for monitoring the temperature within an annealing lehr or oven, encoder 12 would, of course, be positioned within the oven and include a heat protective housing.

Signal 16, which is provided at the output of encoder 12, may be transmitted directly to a remotely positioned receiver 17, but, as illustrated in FIG. 1, is preferably applied to the input of an FM transmitter 18, which frequency modulates the signal a second time and thereafter transmits this dual frequency modulated signal to receiver 17. The signal is received and thereafter applied to a decoder 20 which processes the received signal and applies the processed signal to a display unit 22 which may take the form of, for example, a conventional readout or nixie tube arrangement preferably appropriately calibrated for indicating temperature directly. Because receiver 17, transmitter 18, decoder 20 and display unit 22 are conventional circuit arrangements well within the skill of the art and form no part of the present invention other than in combination with encoder 12, a description of each will be omitted.

Figure 2:
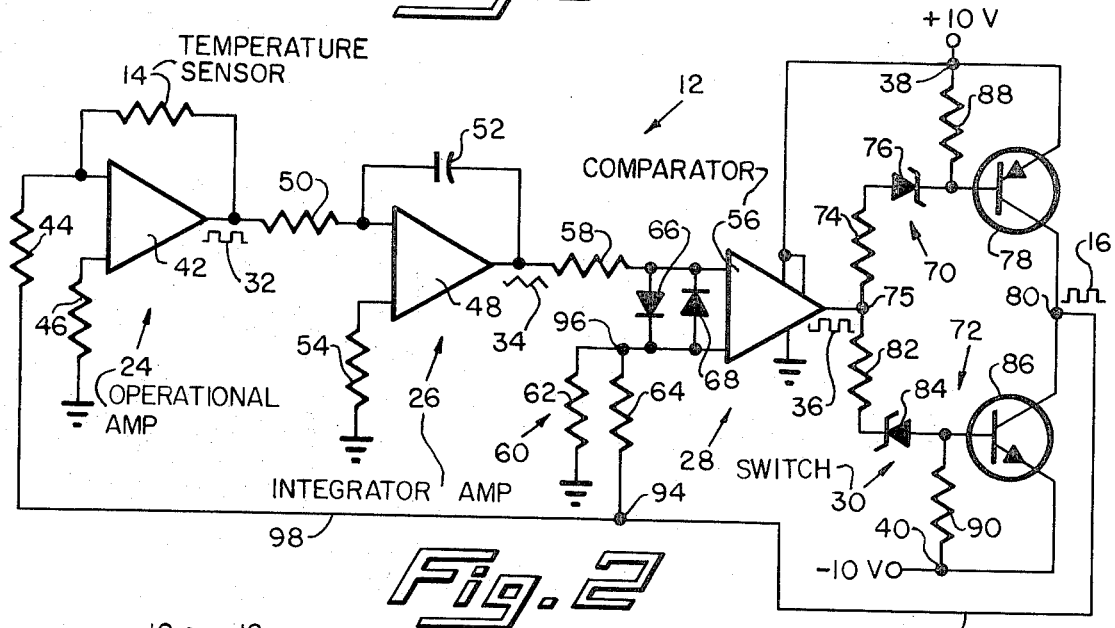
FIG. 2 is a detailed schematic diagram of an encoding device which is utilized with the system illustrated in FIG. 1 and which is constructed in accordance with the present invention.

Turning now to FIG. 2, attention is directed to encoder 12 which, as illustrated, includes an operational amplifier circuit 24, an integrator circuit 26, a comparator circuit 28 and a switching arrangement 30, all of which cooperate to produce the aforementioned signal 16. As will be described in more detail hereinafter, signal 16 is fed back to operational amplifier circuit 24 to initiate the square-wave output signal 32 (FIG. 3b), which is inverted with respect to signal 16 and which has a peak-to-peak amplitude dependent upon and proportional to the temperature of resistor 14. Signal 32 is applied to the input of integrator circuit 26 which, in response thereto, produces triangular or sawtooth output signal 34 (FIG. 3c) inverted with respect to signal 32 and having a constant peak-to-peak amplitude and a ramp incline which is dependent upon and proportional to the amplitude of signal 32.

As illustrated in FIG. 2, signal 34 is applied to one input of comparator circuit 28 for comparison with the aforedescribed output signal 16 which, as will be seen hereinafter, is also fed back to a second or comparison input of circuit 28. In this manner, the output of circuit 28 switches between 0 and +10 volts at a frequency dependent upon the values of signals 34 and 16 and thus provides a signal 36 as illustrated in FIG. 3d. Circuit arrangement 30, which is connected to the output of comparator circuit 28 and which includes two junctions 38 and 40, respectively, connected to, for example, a +10 volt DC voltage supply and a −10 volt DC voltage supply, responds to signal 36 for producing the aforestated output signal 16 at a frequency equal to that of signal 36 and positive and negative peak amplitudes, respectively, equal to that of the +10 volt and −10 volt power supplies.

Since the frequency of signal 16 is dependent upon the frequencies of signals 36 and 34 which, in turn, are linearly dependent upon the amplitude of signal 32, and since the amplitude of signal 32 is proportional to the temperature of resistor 14 (i.e., its resistance), it should be apparent that the frequency of signal 16 is proportional to and indicative of the temperature of resistor 14 and its immediate environment. In accordance with the present invention, as will be seen hereinafter, this temperature indicative output signal displays a peak amplitude which alternately clamps to a voltage level equal to the aforestated power supplies and displays a frequency which is unaffected by fluctuation in these power supplies.

Turning now to a detailed description of the circuits comprising encoder 12, attention is firstly directed to operational amplifier circuit 24 which, as illustrated in FIG. 2, includes a conventional integrated circuit 42 such as, for example a Burr Brown 3500C circuit, a 12.5K ohm input resistor 44 and aforedescribed platinum resistor 14, the latter of which is connected in a feedback loop between the input and output of the integrated circuit. In addition, the integrated circuit is grounded through a 1K ohm resistor 46 which reduces the effect of variation in bias current caused by temperature variations in the circuit. Constructed in this manner, circuit 24 displays a negative gain equal to the resistance of platinum resistor 14 divided by the resistance of input resistor 44. Accordingly, as will be seen hereinafter, when signal 16, which is applied to the input of circuit 24, is positive, signal 32 is negative; and when signal 16 is negative, signal 32 is positive.

As noted above, and as will be seen hereinafter, specific values of many of the components making up encoder 12 have been and will be designated. It is to be understood that these specific values are provided only for illustrating a working embodiment of the present invention and are not intended to limit its scope. Alternate values will be readily apparent to those with ordinary skill in the art.

Like operational amplifier circuit 24, integrator circuit 26 also includes a conventional integrated circuit 48, such as, for example, a Burr Brown 3500C circuit, a 1.1K ohm input resistor 50 and a 0.01 μfarad feedback capacitor 52. In addition, this circuit is grounded through a 1K ohm resistor 54 for the same temperature compensation purpose as was described with respect to integrated circuit 42. Circuit 26 also displays a negative gain equal to the capacitance of capacitor 52 divided by the resistance of resistor 50. In this manner, when signal 32 is positive, signal 34 responds going negative and when signal 32 is negative, signal 34 responds going positive. Hence, it should be readily apparent that signal 34 is continuously in phase with output signal 16.

Attention is now directed to comparator circuit 28 which includes a grounded conventional integrated circuit 56 such as, for example, a number AD351K circuit manufactured by Analog Devices Inc. This integrated circuit has one input connected through a 25K ohm input resistor 58 to the output of circuit 26 for receiving signal 34 and a second input connected through a voltage divider network 60 comprising 51.1K ohm resistors 62 and 64 to the output of switch arrangement 30 for receiving signal 16. In addition, a pair of diodes 66 and 68 are connected across the inputs of integrated circuit 56 in the manner illustrated in FIG. 2 for limiting the voltage difference between the two inputs and therefore minimizing the possibility of overheating these points. Operationally, as will be seen hereinafter, the signal 16, after being reduced to one-half its amplitude by voltage divider 60, and signal 34, are compared at the inputs of integrated circuit 56. When these signals are equal and positive, the voltage at the circuit's output is zero and when these signals are equal and negative, the voltage at the circuit's output is +10 volts. In this manner, signal 36 is produced and displays a frequency equal to the frequency of signal 34.

Attention is now directed to switch arrangement 30 which comprises two subcircuits 70 and 72. Subcircuit 70 includes a 33K ohm resistor 74 connected at one end to a junction 75 at the output of comparator circuit 28 and at its other end to the cathode of a zener diode 76 displaying a breakdown characteristic of 5 volts. The anode of zener diode 76 is connected to the base of a PNP transistor 78 which has its emitter connected to the aforestated junction 38 and its collector connected to an output junction 80 of the switch assembly. In this regard, it should be noted that junction 38 is also connected back to circuit 56.

Subcircuit 72 also includes a 33K ohm resistor 82 connected at one end to junction 75 or the output of comparator circuit 28 and at its other end to the anode of a zener diode 84 displaying a breakdown characteristic of 15 volts. The cathode of zener diode 84 is connected to the base of an NPN transistor 86 which has its emitter connected to the aforestated junction 40 and its collector connected to switch arrangement output junction 80. As illustrated in FIG. 2, both transistors 78 and 86, respectively, include 10K ohm emitter-to-base connected resistors 88 and 90 which compensate for leakage current.

Operationally, when the voltage level at the output of comparator circuit 28 or junction 75 is at zero, the voltage between junction 38 and junction 75 is equal to +10 volts (10v − 0v) which appropriately reverse biases zener diode 76 for maintaining transistor 78 in a conductive or ON state. By the same token, the voltage between junction 40 and junction 75 is −10 volts (−10v − 0v) or below the breakdown level of zener diode 84, thereby maintaining transistor 86 in a nonconductive or OFF state. In going to a positive 10 volt level, when signal 36 reaches +4 volts, the voltage level between junction 38 and junction 75 is at +6 volts (10v − 4v) which causes the zener diode to turn off transistor 78. As the voltage of signal 36 approaches 6 volts, the voltage level between junction 40 and junction 75 is equal to −16 volts (−10v − 6v) which causes a breakdown in zener diode 84 and therefore turns on transistor 86.

It should be readily apparent that after signal 36 reaches its +10 volt peak level and starts towards zero again, the transistor 86 will turn off when the voltage level of signal 36 reaches 6 volts and that transistor 78 will again turn on when the voltage level of signal 36 reaches 4 volts. In this manner, the two transistors alternate between conductive and nonconductive states for producing signal 16 at the junction 80 and at a frequency equal to that of signal 36. In addition, it should also be apparent that one of the transistors will always be in a nonconductive or OFF state before the other transistor goes to its conductive or ON state.

With encoder 12 constructed in the aforedescribed manner, attention is now directed to its overall operation. Upon initially energizing the encoder, it is readily apparent that the output junction 75 of comparator circuit 28 is at a zero voltage level, as illustrated by negative half-cycle 36a in FIG. 3d. Accordingly, upon energization, the transistor 78 of switch assembly 30 is in a conductive state causing a voltage level of +10 volts to appear at output junction 80. This is indicated by the first half-cycle 16a of output signal 16, as illustrated in FIG. 3a. This half-cycle is applied through a feedback lead 92 to a junction 94 and thereafter to previously-described voltage divider 60 which applies half the value of half-cycle 16a or +5 volts to a junction 96 or the reference input of integrated circuit 56. Simultaneously therewith, positive half-cycle 16a is applied from junction 94 through a lead 98 to the input of operational amplifier 24 through input resistor 44.

Since the gain of circuit 24 is equal to $-R_{14}/R_{44}$, where $R_{14}$ is the resistance of platinum resistor 14 and $R_{44}$ is the resistance of input resistor 44, the voltage level at the output of circuit 24, in response to half-cycle 16a is equal to +10 volts or the voltage level of half-cycle 16a multiplied by this gain which is illustrated by the first negative or inverted half-cycle 32a of signal 32, as shown in FIG. 3b. Since the resistance of platinum resistor 14 is proportional to its temperature and since the gain of circuit 24 is a linear function of this resistance, it should be readily apparent that the amplitude of half-cycle 32a is proportional to the resistor's temperature and accordingly is indicative thereof.

Half-cycle 32a of signal 32 is applied through input resistor 50 to the input of integrator circuit 26 which, as stated above, also displays a negative gain which is equal to the capacitance of capacitor 52 divided by the resistance of resistor 50. Accordingly, in response to negative half-cycle 32a, circuit 26 produces a positive-going ramp signal, the incline angle of which is linearly dependent upon the amplitude of half-cycle 32a, this being illustrated by the first positive-going portion 34a, as illustrated in FIG. 3c.

Signal portion 34a is applied through input resistor 58 to the first input of comparator circuit 28 where it is compared to the aforestated +5 volts appearing at junction 96. When this positive-going signal reaches 5 volts or the voltage level at junction 96, the output of circuit 28 switches from zero volts to +10 volts, as illustrated by the second or positive half-cycle 36b of signal 36.

As stated above, as the voltage level at the output of comparator circuit 28 rises to 10 volts, the transistor 78 turns off and the transistor 86 turns on causing the voltage level at junction 80 or the output of switch assembly 30 to switch from +10 volts to negative −10 volts as illustrated by the second or negative half-cycle 16b of output signal 16. Like half-cycle 16a, half-cycle 16b is applied via feedback lead 92 to voltage divider 60 thereby applying a −5 volts or one-half the level of half-cycle 16b to junction 96. Simultaneously, half-cycle 16b is applied to the input of operational amplifier circuit 24 which, in response thereto produces a positive signal 32b (FIG. 3b) the amplitude of which is again linearly dependent upon the resistance of resistor 14. This positive half-cycle signal is applied to integrator circuit 26 for initiating the production of a negative-going ramp or signal portion 34b (FIG. 3c) having an angle of incline which is linearly dependent upon the amplitude of signal 32b. When signal portion 34b reaches −5 volts or a level equal to that appearing at junction 96, the output of comparator circuit 28 switches from +10 volts back to 0 volts and in so doing turns off transistor 86 and turns on transistor 78 for proucing a further positive half-cycle 16a.

The foregoing operational procedure is continuously repeated for producing an output signal at junction 80 (signal 16) having a +10 volt to −10 volt peak-to-peak amplitude and a frequency indicative of the temperature of resistor 14.

In accordance with the present invention, if the voltage level at either junction 38 or 40 fluctuates from its +10 volt or −10 volt supply level, the frequency of signal 16 will remain unaffected. This may be best illustrated by assuming that the +10 volt supply connected with junction 38 drops to +5 volts or one-half of its original level. Since the output of operational amplifier circuit 24 is a product of its gain multiplied by the amplitude of half-cycle 16a, this would result in reducing the amplitude of half-cycle 32a to one-half of what it would have otherwise been if the voltage level of half-cycle 16a were at 10 volts. This, in turn, would cause the positive-going ramp portion 34a of FIG. 3 to increase at half the rate it would have otherwise increased. However, the positive-going ramp now only has to reach +2½ volts (the voltage level applied to junction 96) rather than +5 volts for switching the output of comparator circuit 28. In other words, the switching time will be the same and the frequency of output signal 16 will be the same regardless of whether 10 volts or 5 volts is applied to junction 38.

In addition to eliminating output frequency variation due to power supply fluctuation, it should be noted that encoder 12 requires a minimal amount of power consumption for its operation. Specifically, only the voltage divider 60 and input resistor 44 consume measureable amounts of power, the integrated circuits utilizing nominal power for operation thereof. Further, encoder 12 requires only 5 precision components, that is, components which directly affect the output signal 16. These components are resistor 44, which is a factor in determining gain of operational amplifier circuit 24, resistor 50 and capacitor 52, which are factors in determining the gain of integrator circuit 26 and resistors 62 and 64 which determine the voltage level applied to junction 96 or the reference input to integrated circuit 56. By utilizing only five precision components, the accuracy and reliability of encoder 12 is maximized.

As stated above, it is to be understood that the specific values attributed to various ones of the components comprising encoder 12 have been designated for illustrating a working embodiment of the present invention and are not intended to limit its scope. The values of these components may vary so long as the encoder operates in the aforedescribed manner to produce a condition indicative signal. In addition, although a single embodiment of the present invention has been illustrated and described, it is anticipated that various changes and modifications will be apparent to those skilled in the art, and that such changes may be made without departing from the scope of the invention as defined by the following claims.

What is claimed is:

1. A device for producing an output signal indicative of a temperature, said device comprising:

an operational amplifier having a temperature sensing means connected in its negative feedback circuit;

a comparator circuit having a first and second input;

an integrating circuit connected between said operational amplifier and said first input of said comparator circuit;

switching means connected to the output of said comparator circuit for producing an output indicative of said temperature, said output indicative of said temperature being resistively connected to the input of said operational amplifier and the second input of said comparator circuit.

2. A device set forth in claim 1 wherein said switching means comprises:

first and second semiconductor devices;

first and second zener diodes;

first and second junctions adapted for connection with a voltage supplies;

said first zener diode and said first semiconductor being connected in series between the output of said switching means and the output of said comparator and in parallel with the series connection of said second zener and said second semiconductor;

said output of said comparator being connected to said zener diodes;

said first junction being connected to a point between said first zener and said first semiconductor, said second junction being connected to a point between said second zener and said second semiconductor device.

3. A device as set forth in claim 2 wherein each said first and second semiconductor device has an emitter, a collector and a base electrode, said emitter of said first semiconductor being connected to said first junction and said emitter of said second semiconductor being connected to said second junction, said collector of said first semiconductor being connected to said collector of said second semiconductor and to said output of said switching means; and wherein said base of said first semiconductor is connected to the cathode of said first zener diode and said base of said second semiconductor is connected to the anode of said second zener diode.

4. A device setforth in claim 3 to further comprise a first resistor connected in the input circuit of said operational amplifier; a second resistor connected in the input circuit of said integrating circuit and a capacitor connected between the input and the output of said integrating circuit; said operational amplifier having a negative gain equal to the resistance of said temperature sensing means divided by the resistance of said first resistor, said integrating amplifier having a negative gain equal to the capacitance of said capacitor divided by the resistance of said second resistor.

* * * * *